United States Patent
Lee et al.

(10) Patent No.: US 11,621,449 B2
(45) Date of Patent: Apr. 4, 2023

(54) BATTERY MODULE AND BATTERY PACK INCLUDING THE SAME

(71) Applicant: LG CHEM, LTD., Seoul (KR)

(72) Inventors: Tae-Gyu Lee, Daejeon (KR); Suk-Hoon Lee, Daejeon (KR); Bum Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 173 days.

(21) Appl. No.: 16/756,362

(22) PCT Filed: Jul. 3, 2019

(86) PCT No.: PCT/KR2019/008157
§ 371 (c)(1),
(2) Date: Apr. 15, 2020

(87) PCT Pub. No.: WO2020/054955
PCT Pub. Date: Mar. 19, 2020

(65) Prior Publication Data
US 2020/0259230 A1    Aug. 13, 2020

(30) Foreign Application Priority Data
Sep. 12, 2018 (KR) ......................... 10-2018-0109209

(51) Int. Cl.
| | | |
|---|---|---|
| *H01M 10/6551* | (2014.01) | |
| *H01M 10/0525* | (2010.01) | |
| *H01M 10/613* | (2014.01) | |
| *H01M 10/617* | (2014.01) | |
| H01M 50/213 | (2021.01) | |
| H01M 50/211 | (2021.01) | |
| H01M 50/505 | (2021.01) | |
| H01M 50/227 | (2021.01) | |

(52) U.S. Cl.
CPC ... *H01M 10/6551* (2015.04); *H01M 10/0525* (2013.01); *H01M 10/613* (2015.04); *H01M 10/617* (2015.04); H01M 50/211 (2021.01); H01M 50/213 (2021.01); H01M 50/227 (2021.01); H01M 50/505 (2021.01)

(58) Field of Classification Search
CPC ......... H01M 10/6551; H01M 10/0525; H01M 10/613; H01M 10/617; H01M 50/20; H01M 50/502; H01M 10/655; H01M 10/643; H01M 10/653; H01M 10/6562; H01M 50/213; H01M 2220/30; Y02E 60/10
See application file for complete search history.

(56) References Cited

U.S. PATENT DOCUMENTS

| | | | |
|---|---|---|---|
| 2001/0046624 A1 | 11/2001 | Goto et al. | |
| 2003/0013009 A1 | 1/2003 | Dansui et al. | |
| 2011/0189523 A1 | 8/2011 | Eom | |
| 2012/0315425 A1 | 12/2012 | Kwak et al. | |
| 2017/0301964 A1* | 10/2017 | Murakami | H01M 10/613 |
| 2017/0331164 A1 | 11/2017 | Kwon | |
| 2018/0093388 A1* | 4/2018 | Yun | H01M 50/557 |
| 2018/0287226 A1* | 10/2018 | Yoo | H01M 10/6554 |
| 2019/0044112 A1* | 2/2019 | Klee | H01M 10/425 |
| 2019/0109353 A1* | 4/2019 | Hwang | H01M 10/653 |
| 2019/0173138 A1* | 6/2019 | Tian | H01M 10/6551 |
| 2020/0357208 A1* | 11/2020 | Hyun | H01M 50/216 |
| 2020/0373608 A1* | 11/2020 | Kim | H01M 50/244 |
| 2021/0288368 A1* | 9/2021 | Boehmer | H01M 50/184 |

FOREIGN PATENT DOCUMENTS

| | | |
|---|---|---|
| EP | 2187473 A | 5/2010 |
| EP | 2 405 528 A1 | 1/2012 |
| EP | 2 541 668 A1 | 1/2013 |
| EP | 2784869 A1 | 10/2014 |
| JP | 4196521 B2 | 12/2008 |
| JP | 2010-123349 A | 6/2010 |
| JP | 4833420 B2 | 12/2011 |
| JP | 2012-190760 A | 10/2012 |
| JP | 2014-022114 A | 2/2014 |
| KR | 10-2011-0090468 A | 8/2011 |
| KR | 10-2011-0130277 A | 12/2011 |
| KR | 10-2012-0137698 A | 12/2012 |
| KR | 10-2014-059357 A1 | 5/2014 |
| KR | 10-2017-0035218 A | 3/2017 |
| KR | 10-2017-0107798 A | 9/2017 |
| KR | 10-2017-0127273 A | 11/2017 |
| WO | 2013/077205 A1 | 5/2013 |

OTHER PUBLICATIONS

International Search Report issued in corresponding International Patent Application No. PCT/KR2019/008157, dated Oct. 18, 2019.
Extended European Search Report dated Dec. 21, 2020, issued in corresponding European Patent Application No. 19859454.1.
Office Action dated Nov. 16, 2020, issued in corresponding Korean Patent Application No. 10-2018-0109209. Note: KR 10-2017-0107798 cited therein is already of record.
Office Action dated Jun. 28, 2021, issued in corresponding Japanese Patent Application No. 2020-521436.

* cited by examiner

*Primary Examiner* — Muhammad S Siddiquee
(74) *Attorney, Agent, or Firm* — Morgan, Lewis & Bockius LLP (57) ABSTRACT

Disclosed is a battery module. The battery module includes at least one battery cell, a casing configured to surround the battery cell and having at least one opening formed therein; and a thermal interface material (TIM) interposed between the casing and the battery cell and exposed out of the casing through the opening of the casing.

11 Claims, 7 Drawing Sheets

BATTERY MODULE AND BATTERY PACK INCLUDING THE SAME

TECHNICAL FIELD

The present application claims priority to Korean Patent Application No. 10-2018-0109209 filed on Sep. 12, 2018 in the Republic of Korea, the disclosures of which are incorporated herein by reference.

The present disclosure relates to a battery module and a battery pack including the battery module, and more particular, to a battery module, which may have an improved heat dissipation characteristic, and a battery pack including the battery module.

BACKGROUND ART

As technology development and demand for a mobile device have increased, demand for a secondary battery as an energy source has rapidly increased. Conventionally, a nickel-cadmium battery or a hydrogen ion battery has been used as the secondary battery. However, a lithium secondary battery is recently widely used because charging and discharging is free due to rare memory effect in comparison with a nickel-based secondary battery, a self-discharge rate is very low, and an energy density is high.

The lithium secondary battery mainly uses a lithium oxide and a carbonaceous material as a positive electrode active material and a negative electrode active material, respectively. The lithium secondary battery includes a secondary battery cell in which a positive electrode plate and a negative electrode plate, respectively coated with the positive electrode active material and the negative electrode active material, are arranged with a separator therebetween, and an exterior, that is a battery case, which seals and receives the secondary battery cell together with an electrolyte solution.

The lithium secondary battery includes a positive electrode, a negative electrode, and a separator interposed therebetween and an electrolyte. Depending on which material is used for the positive electrode active material and the negative electrode active material, the lithium secondary battery is classified into a lithium ion battery (LIB) and a polymer lithium ion battery (PLIB). Generally, an electrode of the lithium secondary battery is prepared by applying the positive or negative electrode active material to a current collector made of aluminum or copper sheet, mesh, film, foil, or the like and then drying the same.

Meanwhile, as the need for a large-capacity structure for a current energy source or the like is increasing, there is recently an increasing demand for a battery module or a battery pack in which a plurality of battery cells are connected in series or in parallel.

However, since the battery module or the battery pack is manufactured such that the plurality of battery cells are closely packed in a narrow space, it is important to easily discharge the heat generated from the battery cells to the outside. However, the conventional battery module or the conventional battery pack has insufficient heat dissipation performance, which lowers the capacity of the battery module or the battery pack due to heat.

DISCLOSURE

Technical Problem

The present disclosure is directed to providing a battery module, which may have an improved heat dissipation characteristic, and a battery pack including the battery module.

Technical Solution

In one aspect of the present disclosure, there is provided a battery module, comprising: at least one battery cell; a casing configured to surround the battery cell and having at least one opening formed therein; and a thermal interface material (TIM) interposed between the casing and the battery cell and exposed out of the casing through the opening of the casing.

Also, the opening may be provided in plural, a support portion may be provided to the casing to be located between any one opening and another opening adjacent thereto, and a contact portion of the support portion in contact with the thermal interface material may be rounded.

In addition, the support portion may be located at the same plane as the thermal interface material, and the support portion and the thermal interface material may be exposed out of the casing together.

Also, the support portion may be located at a different plane from the thermal interface material, and the support portion may be embedded in the thermal interface material so that the thermal interface material other than the support portion is exposed out of the casing.

In addition, the battery cell may be a cylindrical battery cell having a cylindrical shape, and the thermal interface material may be formed with a shape corresponding to the shape of the cylindrical battery cell so as to be in close contact with the cylindrical battery cell.

Also, the casing may be made of a thermally conductive plastic.

In addition, a heat dissipation groove may be formed at the casing to have a depth gradually increasing from a rim portion thereof toward a center portion thereof.

Also, the battery module may further comprise a heat dissipation member coupled to the casing and provided in contact with the thermal interface material exposed out of the casing through the opening of the casing.

In addition, an accommodation groove may be formed in at least one side of the heat dissipation member to accommodate the thermal interface material.

Meanwhile, in another aspect of the present disclosure, there is also provided a battery pack, which comprises the battery module described above.

Advantageous Effects

According to the embodiments of the present disclosure, since the thermal interface material is exposed out of the casing to be in direct contact with the fluid, the heat dissipation characteristic may be improved.

Also, since the contact area between the case and the fluid is increased, the heat dissipation characteristic may be improved.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the drawings, the size of each element or a specific part of the element may be exaggerated, omitted, or schematically illustrated for convenience and clarity of a description. Thus, the size of each element does not entirely reflect the actual size of the element. A detailed description of well-known functions or elements associated with the present disclosure will be omitted if it unnecessarily obscures the subject matter of the present disclosure.

The term, 'combine' or 'connect' as used herein, may refer not only to a case where one member and another member are directly combined or directly connected but also a case where one member is indirectly combined with another member via a connecting member or is indirectly connected.

Figure 1:
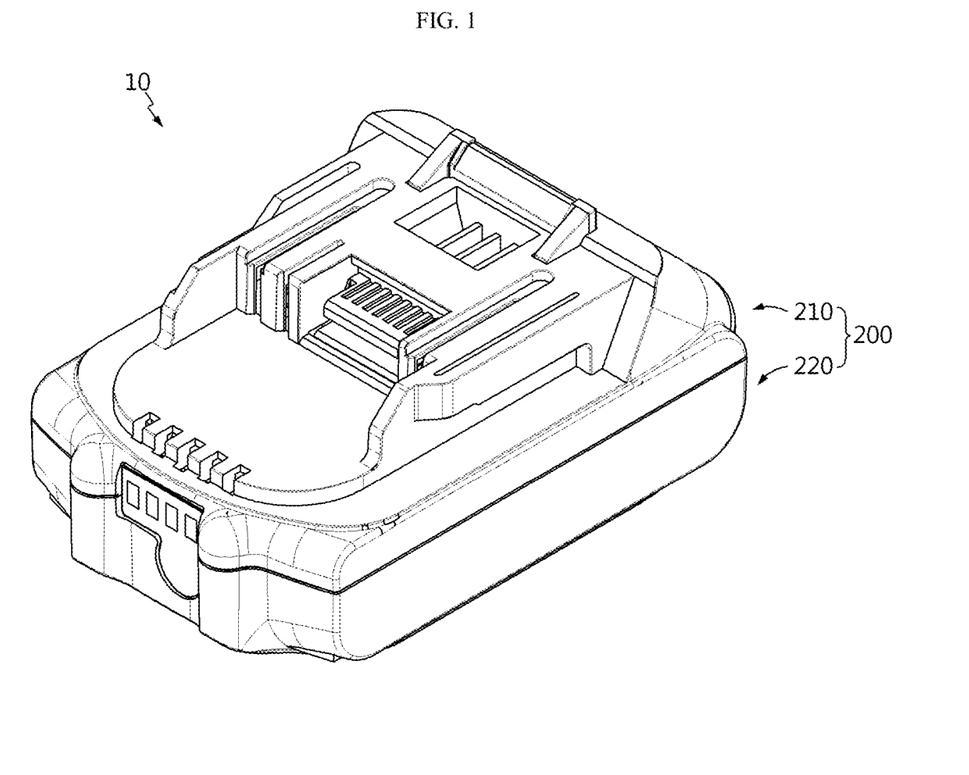
FIG. 1 is a schematic perspective view showing an overall battery module according to the first embodiment of the present disclosure.
Figure 2:
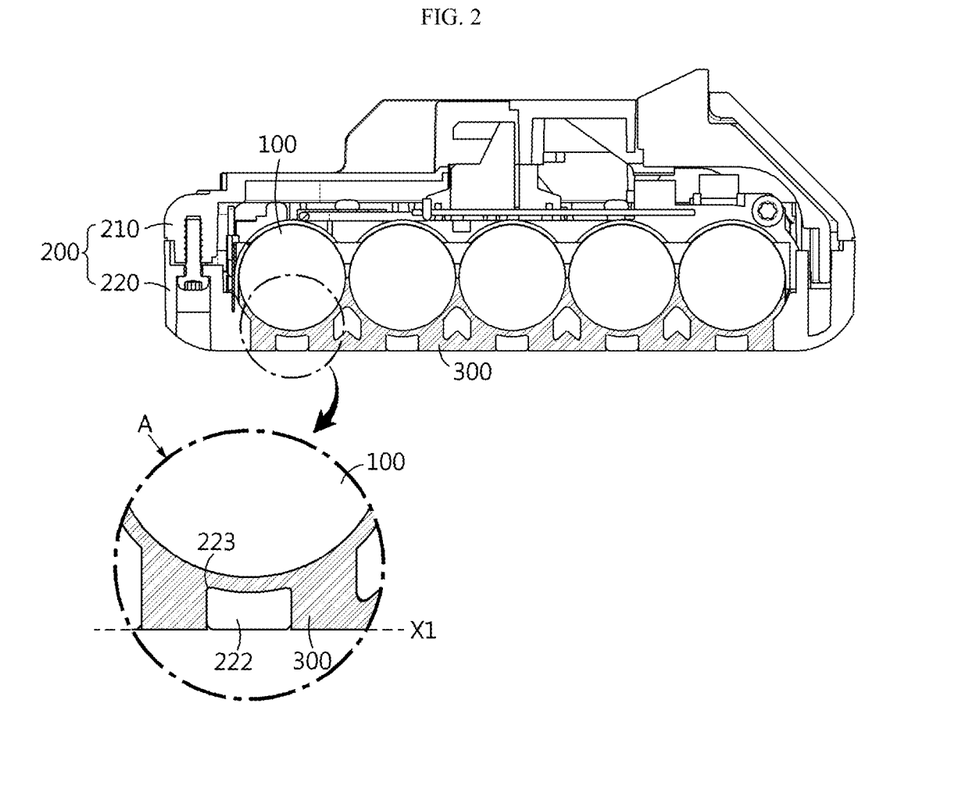
FIG. 2 is a cross-sectioned view showing the battery module according to the first embodiment of the present disclosure.
Figure 3:
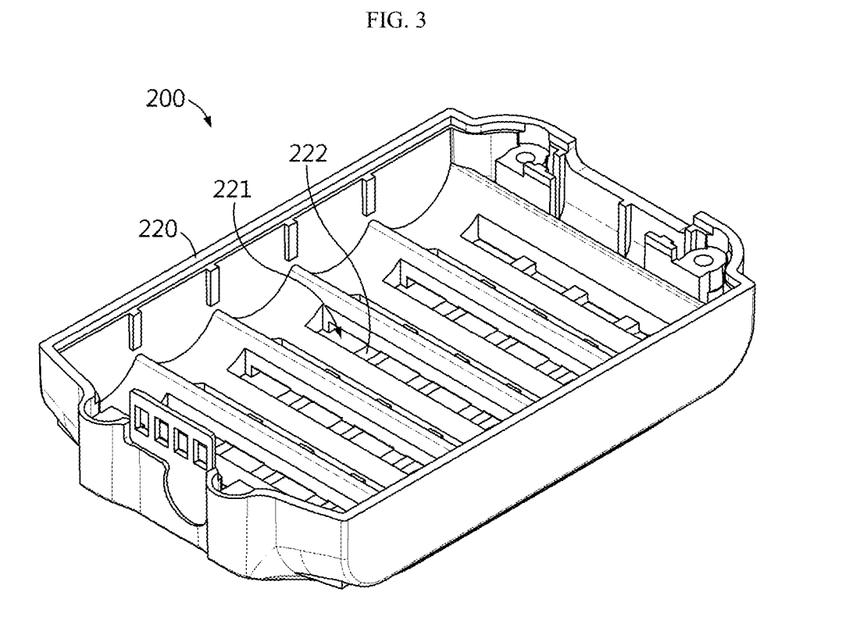
FIG. 3 is a diagram showing an inside of a casing having an opening at the battery module according to the first embodiment of the present disclosure.
Figure 4:
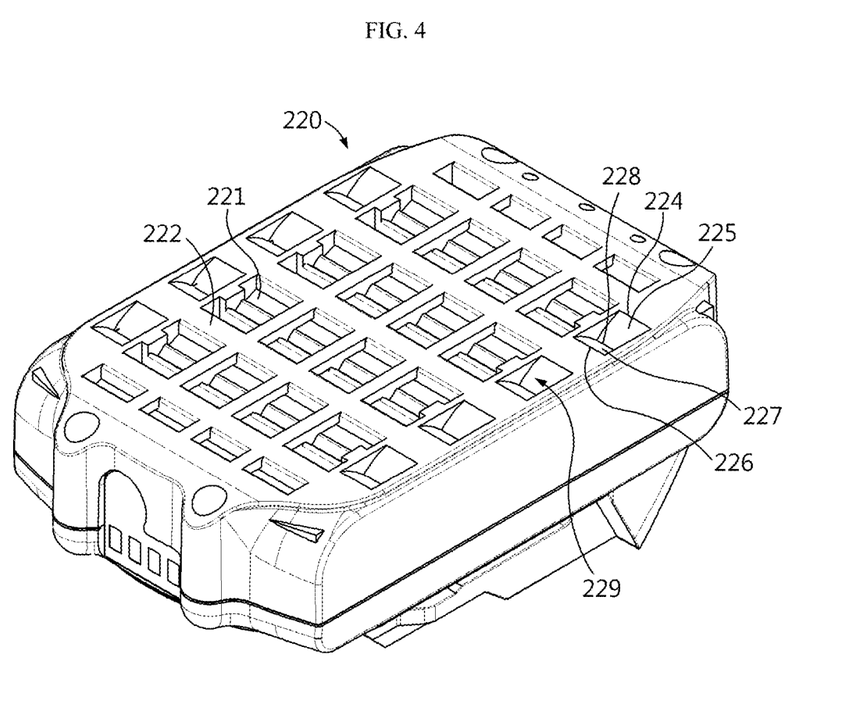
FIG. 4 is a diagram showing an outside of the casing having the opening at the battery module according to the first embodiment of the present disclosure.
Figure 5:
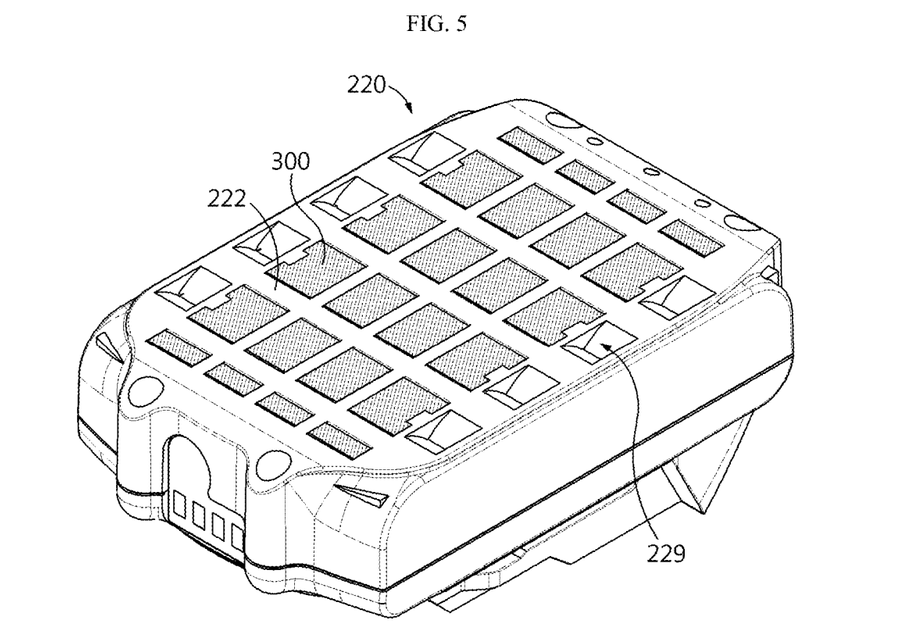
FIG. 5 is a diagram showing that a thermal interface material is exposed through the opening of the casing at the battery module according to the first embodiment of the present disclosure.
Figure 6:
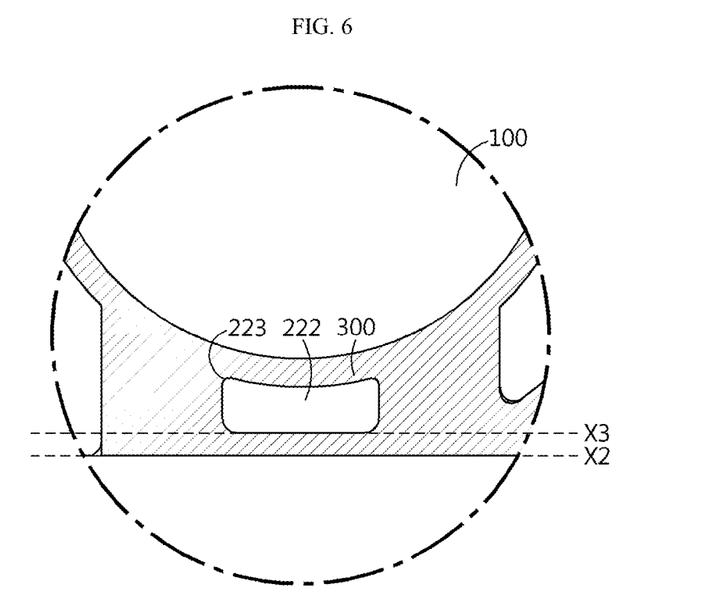
FIG. 6 is a cross-sectioned view showing a modified embodiment of a portion A of the casing of FIG. 2.
Figure 7:
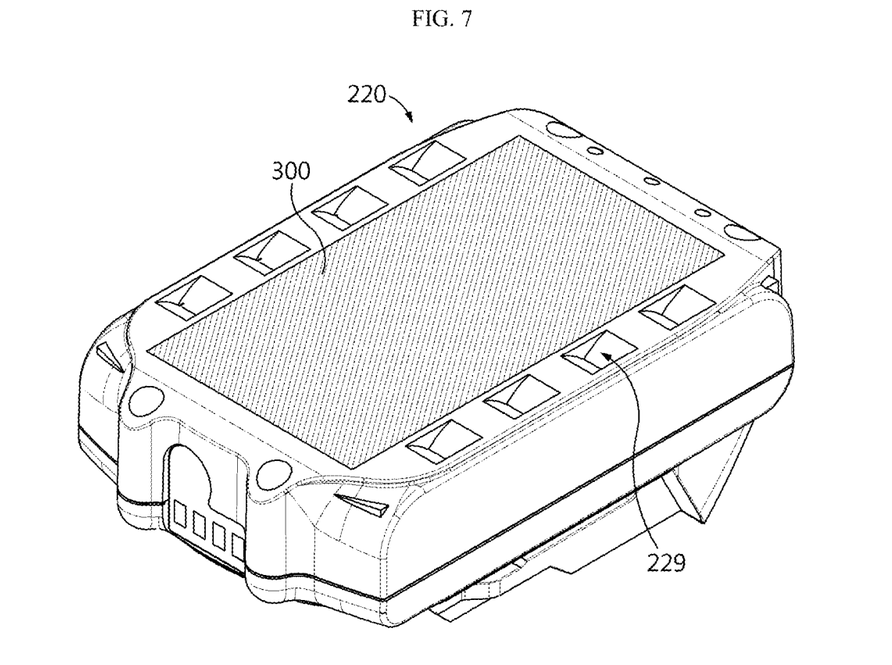
FIG. 7 is a diagram showing that the thermal interface material is exposed through the opening of the casing in the modified embodiment of FIG. 6.
Figure 8:
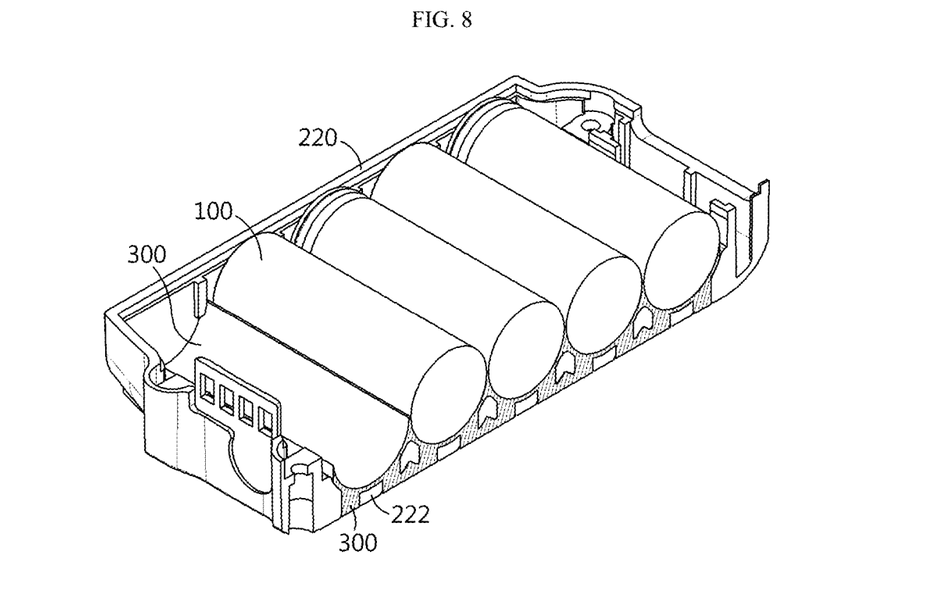
FIG. 8 is a diagram showing that the thermal interface material is in contact with a battery cell at the battery module according to the first embodiment of the present disclosure.

FIG. 1 is a schematic perspective view showing an overall battery module according to the first embodiment of the present disclosure, FIG. 2 is a cross-sectioned view showing the battery module according to the first embodiment of the present disclosure, FIG. 3 is a diagram showing an inside of a casing having an opening at the battery module according to the first embodiment of the present disclosure, FIG. 4 is a diagram showing an outside of the casing having the opening at the battery module according to the first embodiment of the present disclosure, FIG. 5 is a diagram showing that a thermal interface material is exposed through the opening of the casing at the battery module according to the first embodiment of the present disclosure, FIG. 6 is a cross-sectioned view showing a modified embodiment of a portion A of the casing of FIG. 2, FIG. 7 is a diagram showing that the thermal interface material is exposed through the opening of the casing in the modified embodiment of FIG. 6, and FIG. 8 is a diagram showing that the thermal interface material is in contact with a battery cell at the battery module according to the first embodiment of the present disclosure.

Referring to FIGS. 1 to 8, a battery module 10 according to the first embodiment of the present disclosure includes a battery cell 100, a casing 200, and a thermal interface material (TIM) 300.

At least one battery cell 100 may be provided. The battery cell 100 may be a pouch type, or a cylindrical type as in FIG. 2. If the battery cell 100 is a pouch type, the battery cell 100 may include an electrode lead. The electrode lead provided to the battery cell 100 is a kind of terminal exposed to the outside and connected to an external device and may be made of a conductive material. The electrode lead may include a positive electrode lead and a negative electrode lead. The positive electrode lead and the negative electrode lead may be disposed at opposite sides of the battery cell 100 in the longitudinal direction, or the positive electrode lead and the negative electrode lead may be disposed at the same side of the battery cell 110 in the longitudinal direction. The electrode lead may be electrically coupled to a bus bar. The battery cell 110 may have a structure in which a plurality of unit cells, in each of which a positive electrode plate, a separator and a negative electrode plate are arranged in order, or a plurality of bi-cells, in each of which a positive electrode plate, a separator, a negative electrode plate, a separator, a positive electrode plate, a separator and a negative electrode plate are arranged in order, are stacked suitable for a battery capacity. In addition, if the battery cell 100 is a cylindrical type, the battery cell 100 includes an electrode assembly, for example, a jelly-roll type electrode assembly, a cylindrical battery case for accommodating an electrolyte together with the electrode assembly, a positive electrode terminal formed at, for example, an upper portion of the battery case, and a negative electrode terminal formed at, for example, a lower portion of the battery case. The electrode assembly may have a structure in which a separator is interposed between the positive electrode and the negative electrode and wound in a jelly-roll form. A positive electrode lead may be attached to the positive electrode and connected to the positive electrode terminal at, for example, the upper portion of the battery case, and a negative electrode lead is attached to the negative electrode and connected to the negative electrode terminal at, for example, the lower portion of the battery case. In addition, a cylindrical center pin may be inserted into a center portion 228 of the electrode assembly. The center pin fixes and support the electrode assembly and may serve as a passageway for discharging gas generated by internal reactions during charge, discharge and operation. Meanwhile, a safety vent may be provided at an inside of the battery case, for example at a lower portion of a top cap, and the safety vent is ruptured due to a pressure rise inside the battery case to discharge the gas. Hereinafter, for convenience of explanation, the case where the battery cell 100 is a cylindrical battery cell 100 having a cylindrical shape will be mainly described.

The casing 200 is provided to surround the battery cell 100. The casing 200 surrounds the battery cell 100 to protect the battery cell 100 from external vibration or shock. Here, the casing 200 may be configured to include, for example, an upper casing 210 and a lower casing 220. However, the present invention is not limited thereto. At least one opening 221 (see FIGS. 3 and 4) may be formed in the casing 200, for example in the lower casing 220, so that the thermal interface material 300 is exposed to the outside. However, the opening 221 may also be formed in the upper casing 210, if required. As described above, the thermal interface material 300 is exposed out of the casing 200 through the opening 221 formed in the casing 200, and the thermal interface material 300 is brought into contact with a fluid such as air to enable heat dissipation. Referring to FIGS. 3 and 4, the opening 211 may be provided in plural, and the casing 200 may have a support portion 222 located between any one opening 221 and another opening 221 adjacent thereto. The support portion 222 may be integrally formed with the casing 200, or may be prepared separately and then coupled with the casing 200 in various ways. In addition, referring to FIG. 2, a contact portion 223 of the support portion 222 in contact with the thermal interface material 300 may be rounded. If the contact portion 223 of the support portion 222 is rounded as above, the thermal interface material 300 may be prevented from being damaged even though it comes into contact with the contact portion 223 of the support portion 222. Meanwhile, referring to FIG. 2, the support portion 222 may be located at the same plane as the thermal interface material 300. For example, referring to the portion A, which is partially enlarged in FIG. 2, both the support portion 222 and the thermal interface material 300 are may be located at the same plane X1 corresponding to a bottom of the casing 200, based on FIG. 2. By doing so, as shown in FIG. 5, the support portion 222 and the thermal interface material 300 may be exposed out of the casing 200 together. Referring to FIG. 6 showing a modified embodiment, the support portion 222 may be located at a different plane from the thermal interface material 300. For example, based on FIG. 6, the thermal interface material 300 may be located at a plane X2 corresponding to the bottom of the casing 200, and the support portion 222 may be embedded in the thermal interface material 300 and located at the plane X3 above the bottom of the casing 200. By doing so, as shown in FIG. 7, the support portion 222 is not exposed out of the casing 200, and only the thermal interface material 300 other than the support portion 222 may be exposed out of the casing 200. The embodiment of FIG. 5 is structurally stable than the embodiment of FIG. 7, and the embodiment of FIG. 7 ensures improved heat dissipation efficiency than the embodiment of FIG. 5 since the contact area between the thermal interface material 300 and the air is increased. That is, the size and the position of the support portion 222 may be appropriately adjusted in consideration of the structural stability and the heat dissipation efficiency.

A heat dissipation groove 229 may be formed in a portion of the casing 200 where the opening 221 is not formed (see FIG. 4). The heat dissipation groove 229 may be formed at an outer side of the casing 200, for example at a bottom surface of the casing 200. The heat dissipation groove 229 may be formed variously, and, for example, the depth of the heat dissipation groove 229 may be gradually increased from a rim portion of the casing 200 toward a center portion 228 of the casing 200. For example, the heat dissipation groove 229 may be formed by a first inclined portion 225 and a second inclined portion 227. Referring to FIG. 4, the first inclined portion 225 may be formed to be inclined from one rim portion, for example a first rim portion 224, toward the center portion 228, and the second inclined portion 227 may be formed from another rim portion, for example, a second rim portion 226 spaced apart from the first rim portion 224 toward the center portion 228, so that the first inclined portion 225 and the second inclined portion 227 meet at the center portion 228 to form the heat dissipation groove 229. In addition, at least one heat dissipation groove 229 having the above structure may be formed at the bottom surface of the casing 200, for example the lower casing 220. Meanwhile, the heat dissipation groove 229 is not formed only at the bottom surface of the lower casing 220 but may also be formed at a side surface of the lower casing 220 or the upper casing 210, if required. If the heat dissipation groove 229 is formed at the casing 200 as above, the contact area between the casing 200 and the air is increased, thereby improving the heat dissipation efficiency. In addition, the casing 200 may be made of various kinds of thermally conductive plastic, thereby efficiently discharging the heat generated from the battery cell 100.

Referring to FIGS. 2 and 8 together, the thermal interface material 300 is interposed between the casing 200 and the battery cell 100. For example, the thermal interface material 300 may be positioned between the battery cell 100 and the lower casing 220, so that one side of the thermal interface material 300 is in contact with the lower casing 220 and the other side of the thermal interface material 300 is in contact with the surface of the cylindrical battery cell 100. The thermal interface material 300 may include various materials capable of transferring the heat generated from the battery cell 100 to the outside of the battery cell 100. The thermal interface material 300 may be provided, for example, such that graphite surrounds a foam pad, without being limited thereto. The thermal interface material 300 is exposed out of the casing 200 through the opening 221 of the casing 200 so that the exposed portion comes into contact with the air to enable heat dissipation. That is, the heat generated from the battery cell 100 is transferred to the outside through the thermal interface material 300 and cooled. In this process, the thermal interface material 300 exposed to the outside through the opening 221 of the casing 200 may dissipate heat through the air. As shown in FIG. 8, the thermal interface material 300 may be formed to have a shape corresponding to the shape of the cylindrical battery cell 100 so be in close contact with the cylindrical battery cell 100. That is, the thermal interface material 300 may have an arc-shaped cross section. For example, the thermal interface material 300 may be formed to have an arc when viewed from the front or back, but to have a straight shape in the longitudinal direction when viewed from the side. However, the shape of the thermal interface material 300 is not limited thereto.

Hereinafter, the operation and effect of the battery module 10 according to the first embodiment of the present disclosure will be described with reference to the drawings.

The battery module 10 according to the first embodiment of the present disclosure includes the thermal interface material 300 interposed between the cylindrical battery cell 100 and the casing 200, and the thermal interface material 300 may be exposed to the outside through the opening 221 of the casing 200 to be in direct contact with the outside air. As a result, the heat dissipation efficiency may be improved. Meanwhile, the heat dissipation groove 229 may be formed at one side of the casing 200 to be inclined from the rim portion toward the center portion 228 to have a depth gradually increasing toward the center portion 228. Due to the heat dissipation groove 229, the contact area between the casing 200 and the air is increased, thereby improving the heat dissipation efficiency.

Figure 9:
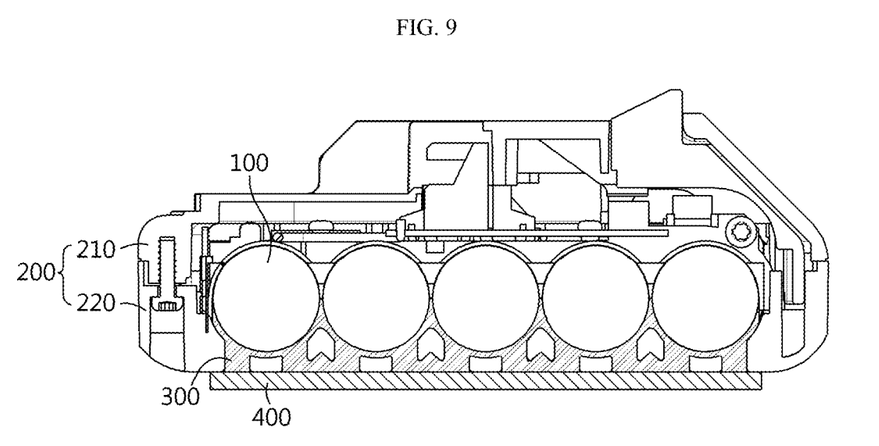
FIG. 9 is a cross-sectioned view showing a battery module according to the second embodiment of the present disclosure.

FIG. 9 is a cross-sectioned view showing a battery module according to the second embodiment of the present disclosure.

Hereinafter, the operations and effects of the battery module 10 according to the second embodiment of the present disclosure will be described with reference to the accompanying drawings. Here, a feature already explained in relation to the battery module 10 according to the first disclosure of the present disclosure will not be described in detail again.

The second embodiment of the present disclosure is different from the first embodiment in that a heat dissipation member 400 is additionally provided.

Referring to FIG. 9, the heat dissipation member 400 may be coupled to the casing 200 and come into contact with the thermal interface material 300 exposed out of the casing 200 through the opening 221 of the casing 200. That is, even though the thermal interface material 300 is exposed out of the casing 200 to contact the air out of the casing 200 and thus dissipate heat in an air-cooling manner in the first embodiment, in the second embodiment, the heat dissipation member 400 comes into contact with the thermal interface material 300 exposed out of the casing 200 so that the thermal interface material 300 dissipates heat by the heat dissipation member 400. Here, the heat dissipation member 400 may be provided in various ways.

Figure 10:
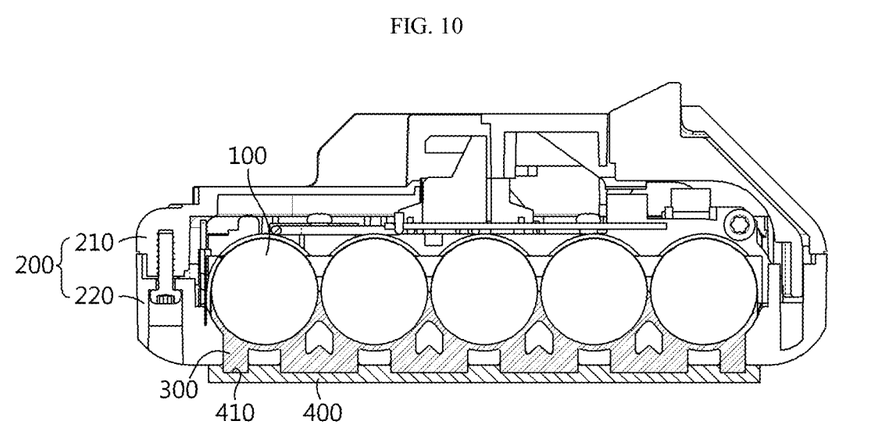
FIG. 10 is a partially sectioned view showing a battery module according to the third embodiment of the present disclosure.

FIG. 10 is a partially sectioned view showing a battery module according to the third embodiment of the present disclosure.

Hereinafter, the operations and effects of the battery module 10 according to the third embodiment of the present disclosure will be described with reference to the accompanying drawings. Here, a feature already explained in relation to the battery module 10 according to the first and second embodiments of the present disclosure will not be described in detail again.

The third embodiment of the present disclosure is different from the first embodiment and the second embodiment in that an accommodation groove 410 is formed in the heat dissipation member 400.

Referring to FIG. 10, the heat dissipation member 400 may be provided in various ways, and, for example, the heat dissipation member 400 may be a cooling plate. The cooling plate may be provided to allow various fluids to flow therein, but the present invention is not limited thereto. In addition, the accommodation groove 410 may be formed in at least one side of the heat dissipation member 400 to accommodate the thermal interface material 300. If the thermal interface material 300 is accommodated in the accommodation groove 410 formed at the heat dissipation member 400, structural stability may be ensured, and also the heat dissipation efficiency may be increased since the contact area between the thermal interface material 300 and the heat dissipation member 400 is increased.

Meanwhile, a battery pack (not shown) according to an embodiment of the present disclosure, may include one or more battery modules 10 according to an embodiment of the present disclosure as described above. Also, in addition to the battery modules 10, the battery pack (not shown) may further includes a case for accommodating the battery modules 10, and various devices for controlling charge and discharge of the battery modules 10, such as a BMS, a current sensor, a fuse, and the like.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The present disclosure relates to a battery module and a battery pack including the battery module and may be used in industries related to secondary batteries.

What is claimed is:

1. A battery module, comprising:
at least one battery cell;
a casing configured to surround the battery cell and having a plurality of openings therein; and
a thermal interface material (TIM) interposed between the casing and the battery cell and exposed out of the casing through the openings of the casing,
wherein the casing includes a support portion between any one opening and another opening adjacent thereto,
wherein a contact portion of the support portion in contact with the thermal interface material is rounded, and
wherein a portion the thermal interface material is interposed between the contact portion of the support portion and the battery cell.

2. The battery module according to claim 1,
wherein the support portion is at the same plane as the thermal interface material, and the support portion and the thermal interface material are exposed out of the casing together.

3. The battery module according to claim 1,
wherein the support portion is at a different plane from the thermal interface material, and the support portion is embedded in the thermal interface material so that the thermal interface material other than the support portion is exposed out of the casing.

4. The battery module according to claim 1,
wherein the battery cell is a cylindrical battery cell having a cylindrical shape, and
wherein the thermal interface material has a shape corresponding to the shape of the cylindrical battery cell so as to be in close contact with the cylindrical battery cell.

5. The battery module according to claim 1,
wherein the casing is made of a thermally conductive plastic.

6. The battery module according to claim 1,
wherein a heat dissipation groove is defined at the casing to have a depth gradually increasing from a rim portion thereof toward a center portion thereof.

7. The battery module according to claim 1, further comprising:
a heat dissipation member coupled to the casing and provided in contact with the thermal interface material exposed out of the casing through the opening of the casing.

8. The battery module according to claim 7,
wherein an accommodation groove is defined in at least one side of the heat dissipation member to accommodate the thermal interface material.

9. A battery pack, comprising the battery module according to claim 1.

10. The battery module according to claim 1, wherein the at least one battery cell is a cylindrical battery cell, and the contact portion of the support portion has a curvature corresponding to a curvature of the cylindrical battery cell.

11. The battery module according to claim 10, wherein the portion of the thermal interface material interposed between the contact portion and the battery cell has a substantially uniform thickness.

\* \* \* \* \*